United States Patent
Reynolds

[11] Patent Number: 5,354,173
[45] Date of Patent: Oct. 11, 1994

[54] TURBINE SCROLL

[75] Inventor: Graham A. Reynolds, Coventry, England

[73] Assignee: Rolls-Royce Business Ventures Limited, Derby, England

[21] Appl. No.: 70,340

[22] PCT Filed: Oct. 11, 1991

[86] PCT No.: PCT/GB91/01774
 § 371 Date: Nov. 4, 1993
 § 102(e) Date: Nov. 4, 1993

[87] PCT Pub. No.: WO92/10649
 PCT Pub. Date: Jun. 25, 1992

[30] Foreign Application Priority Data
 Dec. 14, 1990 [GB] United Kingdom ............ 9027168.5

[51] Int. Cl.⁵ .................................... F01D 25/24
[52] U.S. Cl. ...................... 415/205; 415/204; 415/213.1; 60/39.36
[58] Field of Search ............... 415/203, 204, 205, 206, 415/212.1, 213.1, 215.1, 200, 134; 60/39.32, 39.36

[56] References Cited

U.S. PATENT DOCUMENTS 4,122,673 10/1978 Leins .................................. 415/200
5,094,587 3/1992 Woollenweber .................. 415/205

FOREIGN PATENT DOCUMENTS 1259852 3/1961 France .

*Primary Examiner*—Edward K. Look
*Assistant Examiner*—Christopher Verdier
*Attorney, Agent, or Firm*—Cushman, Darby & Cushman

[57] ABSTRACT

A scroll for directing hot gases into a radial flow turbine includes two annular confronting members which corporate to define a volume; the confronting members are curved in the same axial direction so that one member is inward of the other and support means are included to support the inward confronting member; the configuration ensures that the cross-sectional area of an annular outlet in the radially inner region of the scroll remains substantially constant during variation in scroll temperature.

5 Claims, 2 Drawing Sheets

TURBINE SCROLL

FIELD OF THE INVENTION

This invention relates to a scroll for a radial inflow turbine.

BACKGROUND OF THE INVENTION

Radial inflow turbines, for instance those which are incorporated into small gas turbine engines or turbochargers, are usually associated with a structure commonly referred to as a scroll. The scroll is configured so as to direct hot gases exhausted from the combustion apparatus of the engine into the inlet of the radial inflow turbine. It is typically a hollow generally toroidal to component with provision for the tangential flow of hot combustion gases into its interior and the exhaustion of these gases through a suitable annular outlet into a radial inflow turbine situated at its center.

Such scrolls are, of course, exposed to very high operating temperatures and this gives rise to difficulties associated with the thermal expansion and contraction of its various regions. It has been found with traditional scroll designs that great difficulties are associated with the annular outlet of the scroll. Typically thermal expansion and contraction of the scroll can result in the axial distance across the outlet varying by as much as 10 to 12%. Such variation is highly undesirable in view of the overall effect which it has upon the efficiency of the turbine into which it directs combustion gases.

SUMMARY OF THE INVENTION

It is an object of the present invention to provide a scroll of novel configuration which is less prone to significant variation in the area of its outlet due to thermal effects than is the case with scrolls of conventional configuration.

According to the present invention, a scroll suitable for directing hot gas into a radial inflow turbine comprises an annular chamber defined by two coaxial confronting, axially spaced apart annular members interconnected at their radially outer extents, and means for directing hot gas into said chamber to flow therein in a generally circumferential direction, the radially inner extents of said members cooperating to define an annular exhaust outlet from said chamber to operationally direct said hot gases on to a radial inflow turbine, the major portions of said members converging in a generally radially inward direction towards said annular outlet and being so configured that both of said major portions of said members are of generally curved cross-sectional shape so as to be curved in the same generally axial direction whereby the major portion of one of said members is located inwardly of the other, annular support means coaxial with said members being provided to support said scroll, said support means being attached to said inward member intermediate its radially inward and outward extents and arranged at said attachment to be locally generally normal to said inward member.

BRIEF DESCRIPTION OF THE DRAWINGS

The present invention will now be described, by way of example, with reference to the accompanying drawings in which.

DETAILED DESCRIPTION OF THE INVENTION

Figure 1:
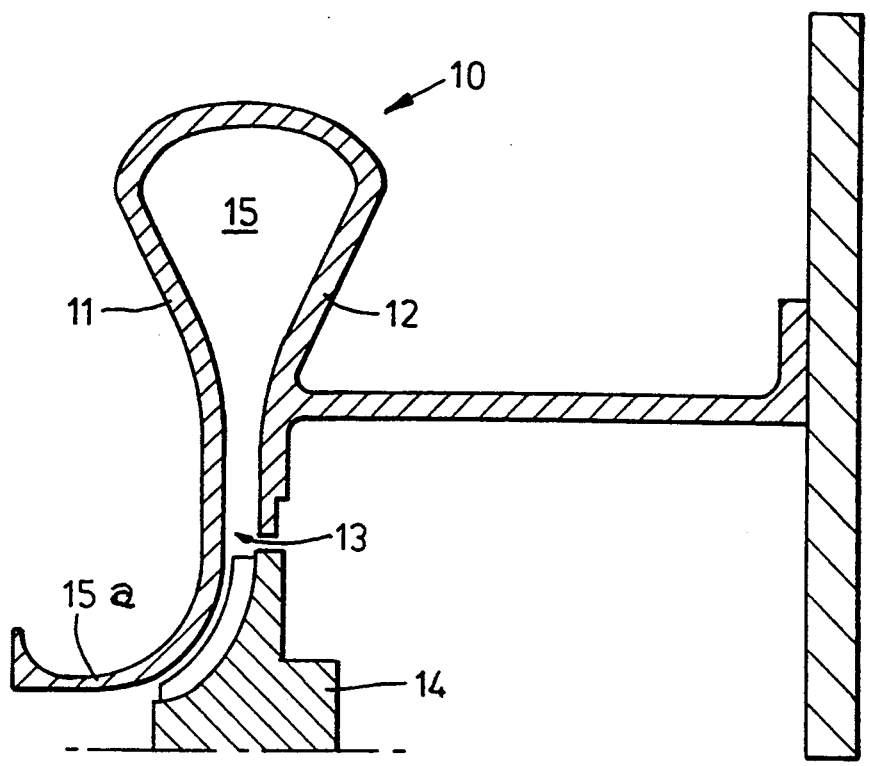
FIG. 1 is a sectioned side view of the upper half of a prior art scroll.

Referring to FIG. 1, a known scroll 10 comprises two axially spaced apart angular walls 11 and 12 which converge in a radially inward direction to define a annular outlet 13 to a radial inflow turbine 14. The walls 11 and 12 are interconnected at their radially outward ends so that they define an annular volume 15. In operation hot gases are directed into the volume 15 in a tangential direction (by means not shown) so that the gases flow generally circumferentially through the volume 15 before being exhausted through the annular outlet 13.

A major drawback with scrolls of this type is that their thermal expansion characteristics result in an undesirably large variation in the cross-sectional area of the annular outlet 13. Moreover since the shroud 15a surrounding the radial inflow turbine 14 is conventionally attached to one of the walls 11, those thermal expansion characteristics result in undesirable variation in the clearance between the shroud 15a and the turbine 14.

Figure 3:
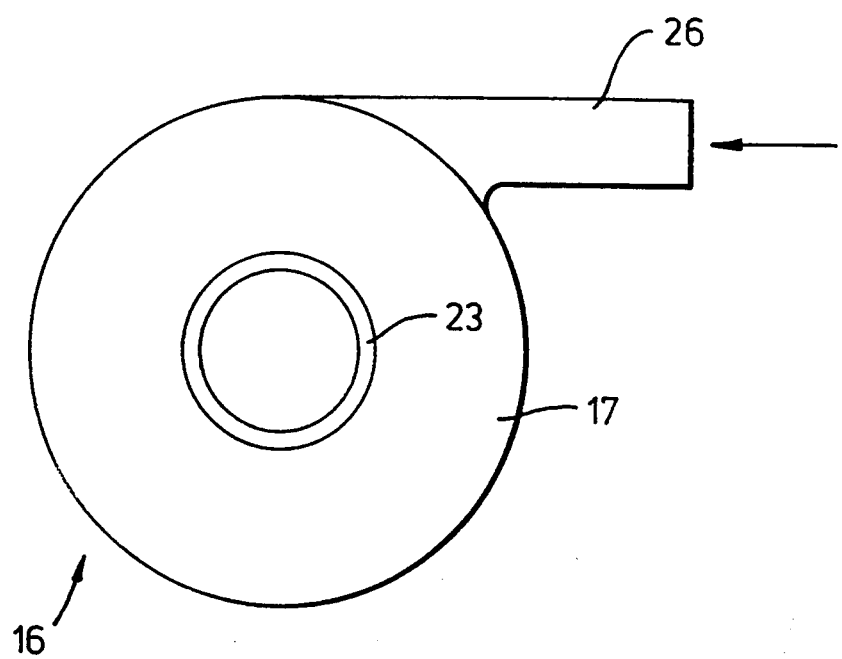
FIG. 3 is a view on arrow A of FIG. 2.
Figure 2:
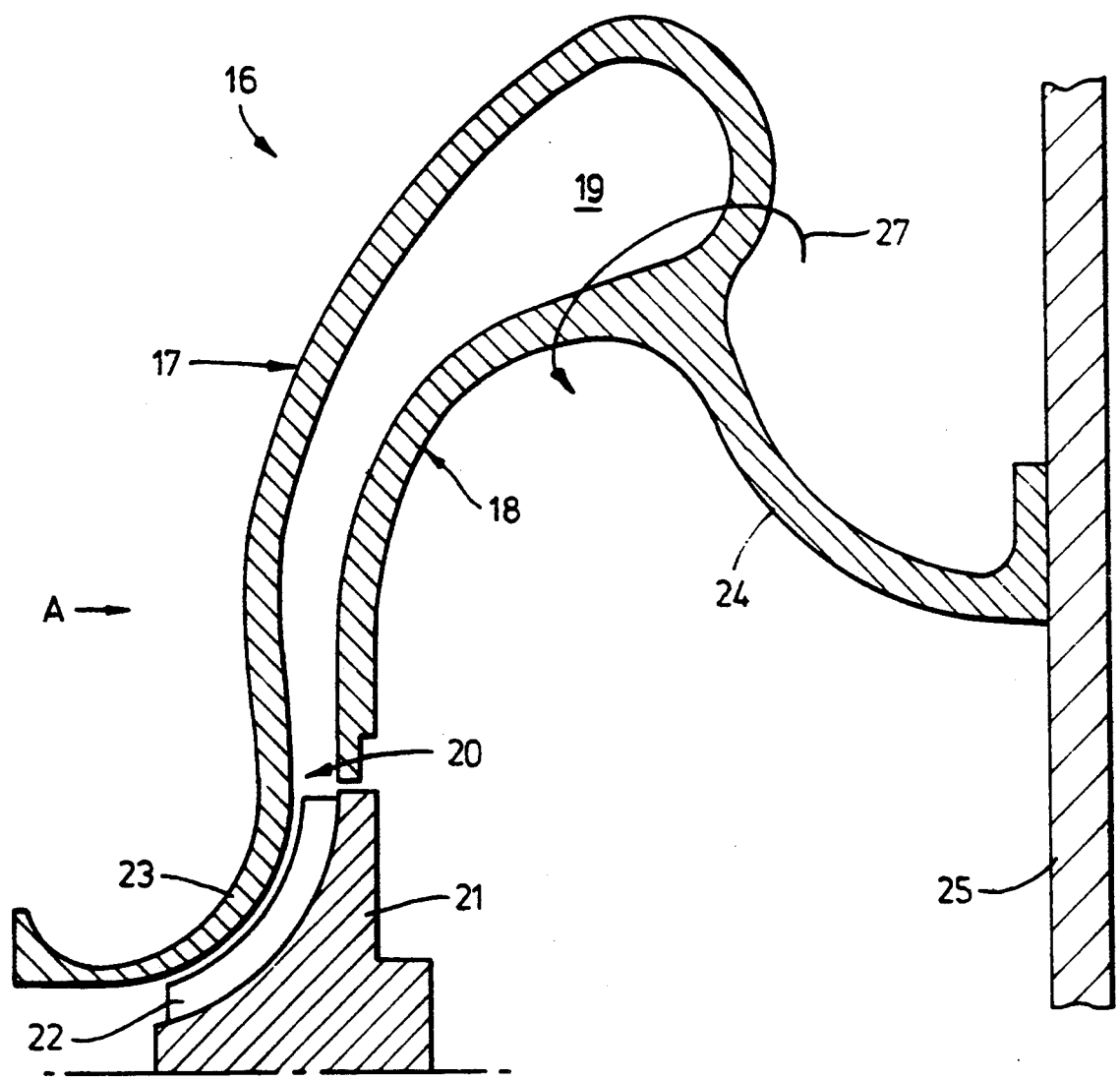
FIG. 2 is a sectioned side view of the upper half of a scroll in accordance with the present invention.

The scroll 16 in accordance with the present invention and shown in FIG. 2 and 3 is so configured as to minimize the effect which the scrolls' thermal expansion characteristics have upon its operation.

Referring to FIG. 2, the scroll 16 comprises two 0 confronting, axially spaced apart annular walls 17 and 18. The walls 17 and 18 are interconnected at their radially outer extents so that they define a volume 19. Their radially inner extents cooperate to define an annular outlet 20 from the volume 19. The annular outlet 20 is located immediately radially outwardly of a radial inflow turbine 21 having aerofoil blades 22. A shroud 23 located around the aerofoil blades 22 in spaced apart relationship therewith is supported from the radially inward extent of the left hand wall 17 as viewed in the drawing and is in fact integral with it.

The annular walls 17 and 18 converge in a generally radially inward direction towards the annular outlet 20. In addition their major portions are both curved in the same generally axial direction so that the right hand wall 18 is located inwardly of the left hand wall 17.

The scroll 16 is supported by an annular support member which is in turn attached to fixed structure 25. The support member 24 is attached to the inward wall member 18 intermediate its radially inner and outer extents and in fact is so attached closer to the radially outer extent than the radially inner extent. The support member 24 is generally radially outwardly flared to such an extent that at its point of attachment to the shorter wall 18, it is generally locally normal to that wall 18.

Referring now to FIG. 3 an inlet duct 26 is located on the periphery of the scroll 16 which is adapted to direct hot gases into the volume 19 in a generally tangential direction. Typically the gases are those which would be exhausted from the combustion equipment of a gas turbine engine (not shown).

The hot gases flow around the volume 19 in a generally circumferential direction before being finally exhausted from the volume 19 through the annular outlet 20. The gases of course heat up the scroll 16 as they pass through it thereby causing its thermal expansion. However the configuration of the scroll 16 is such that such thermal expansion does not have a detrimental effect upon the cross-sectional area of the annular outlet 20 nor indeed upon the clearance between the turbine aerofoil blades 22 and the shroud 23.

As the scroll 16 heats up, the outward of the Scroll walls 17 thermally expands by a greater amount than the inward wall 18 due to its greater length. However since the wall 17 is curved in a generally axial direction, the radially inner extent of the wall 17, that is the extent to which the shroud 23 is attached, remains virtually static. Thus thermal expansion of the longer wall 17 results in movement of its radially outer extent only.

Since the outer scroll wall 17, is attached at its radially outer extent to the inner scroll wall 18, its thermal expansion results in it exerting a load upon the inner scroll wall 18. The inner scroll wall 18 is, as previously mentioned, supported intermediate its radial extents by the annular support member 24. Consequently the load exerted upon the inner wall 18 by the outer wall 17 results in an anticlockwise bending moment as indicated at 27 about the position of attachment of the support 24 to the inner wall 18. This moment opposes the thermal expansion of the inner wall 18 with the result that the radially inner extent of the inner wall 18 remains virtually static.

Consequently since, despite the thermal expansion of the scroll walls 17 and 18, their radially inner extents remain virtually static, then the cross-sectional area of the annular outlet 20 remains substantially constant. Indeed we have found that typically the area of the outlet 20 will vary by as little as 1.5%.

It will be appreciated that the scroll 16 could be manufactured from either metallic or ceramic materials.

I claim:

1. A scroll for directing hot gas into a radial inflow turbine comprising an annular chamber defined by two coaxial confronting, axially spaced apart annular members interconnected at their radially outer extents, said chamber having an inlet, the radially inner extents of said members cooperating to define an annular exhaust outlet from said chamber to operationally direct said hot gases on to the radial inflow turbine, the major portions of said members converging in a generally radially inward direction towards said annular outlet, wherein both of said major portions of said members are of generally curved cross-sectional shape so as to be curved in the same generally axial direction whereby the major portion of one of said members is located inwardly of the other annular support means coaxial with said members being provided to support said scroll, said support means being attached to said inward member intermediate its radially inward and outward extents and arranged at said attachment to be locally normal to said inward member.

2. A scroll as claimed in claim 1 wherein said outward member has a turbine shroud attached thereto.

3. A scroll as claimed in claim 2 wherein said turbine shroud is integral with said outward member.

4. A scroll as claimed in claim 1 wherein said annular support means is of generally flared configuration.

5. A scroll as claimed in claim 1 wherein said scroll is metallic.

* * * * *